Sept. 19, 1939.  R. NIER  2,173,263
HEATING DEVICE FOR WINDSHIELDS OF MOTOR VEHICLES
Filed Dec. 2, 1936
Fig. 1.
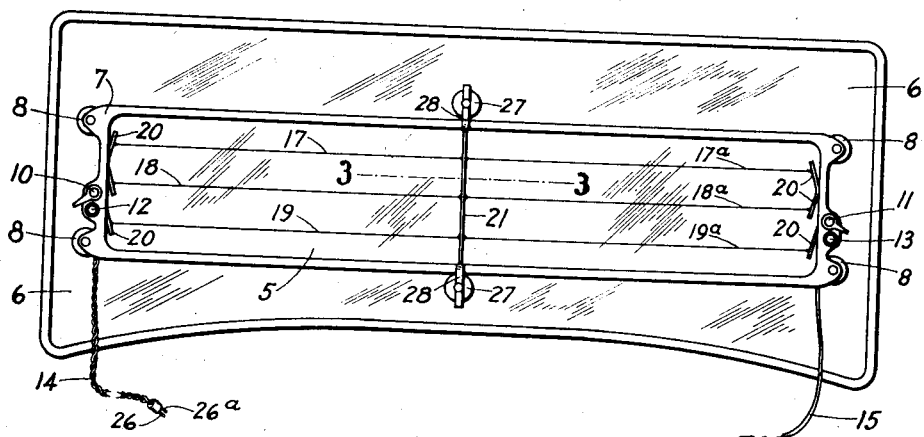
Fig. 3.
Fig. 2.
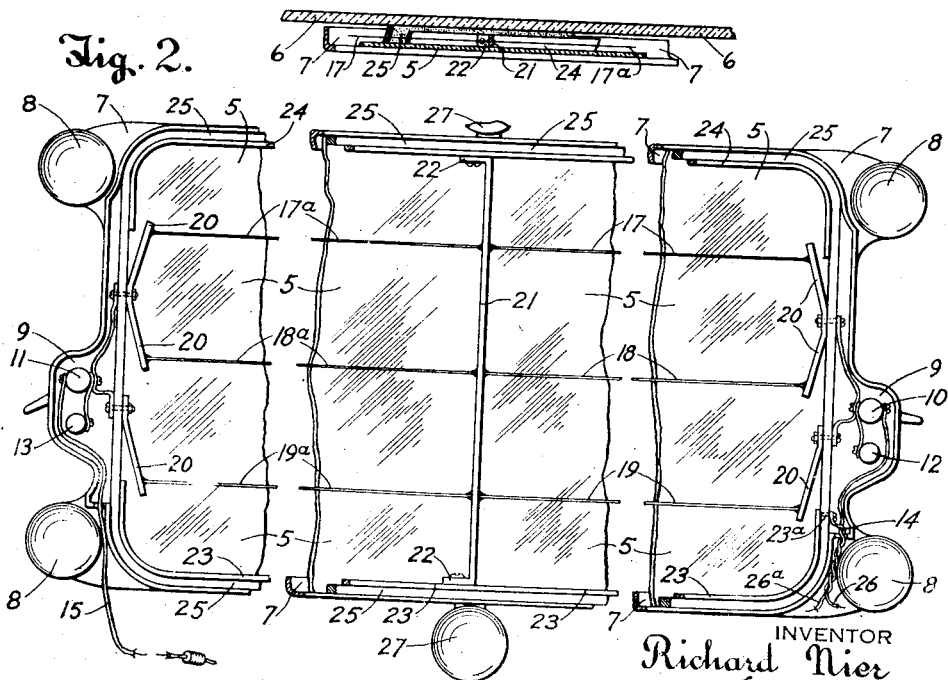
INVENTOR
Richard Nier
BY Francis E. Boyer
ATTORNEY Patented Sept. 19, 1939

2,173,263

UNITED STATES PATENT OFFICE 2,173,263

HEATING DEVICE FOR WINDSHIELDS OF MOTOR VEHICLES

Richard Nier, Beierfeld, Erzgebirge, Germany

Application December 2, 1936, Serial No. 113,776
In Germany December 11, 1935

5 Claims. (Cl. 219—19)

This invention relates to improvements in heating devices for windshields of motor vehicles, the principal object of the invention being to provide a device of this character in which the heating elements may be selectively switched in thereby to heat all or only a part of the area of the windshield within the sphere of operation of the heating device, whereby the supply of heat can be regulated according to the outside temperature.

A further object of the invention is to provide a heating device of this character having pilot lights for visually indicating that the device is operating.

A further object of the invention is to provide a heating device comprising a self-contained unit which can be easily attached to the windshield and the battery of the motor vehicle.

Other objects and advantages of the invention will appear as the description proceeds.

In the drawing accompanying this specification,

Fig. 1 is a rear view of a windshield of a motor vehicle having installed thereon a heating device constructed in accordance with the present invention;

Fig. 2 is an enlarged and broken away view of the heating device showing the side thereof opposite to that shown in Fig. 1; and Fig. 3 is a partial sectional view through the windshield and heating device, taken approximately on line 3—3 of Fig. 1.

Referring to the drawing in detail, the heating device comprises a frame 7 preferably of compressed insulating material and approximately rectangular in form and comprising elongated side members and end members connecting said side members, the frame being of such dimensions as to permit it to be supported well within the area of the glass plate 6 of the windshield, as shown in Fig. 1. Within the frame 7 is mounted a glass panel 5, said panel being adapted to lie parallel with the windshield when the frame is supported thereon. The frame is provided at its four corners with suitable means for retaining rubber suction cups 8 such as are commonly used for attaching articles to windshield plates, an additional pair of cups 27 being attached by means of suitable holders or claws 28 to the opposite sides of the frame approximately at the longitudinal center thereof. The frame is further provided at its opposite ends with housings or receptacles 9 within which are disposed suitable electric switches 10 and 11 respectively, which switches may be of any suitable type. Pilot lights 12 and 13 are also secured to the receptacles 9 in any suitable manner and are in electrical connection with the switches 10 and 11 respectively.

Within the frame 7 are disposed a pair of metallic strips 23 and 24 extending along the side walls and partially along the end walls of the frame, a gasket 25 being clamped between said strips and the walls of the frame, said gasket projecting slightly beyond the edges of the strips and frame thereby to form an airtight heating space between the panel 5 and the glass of the windshield when the frame is in operative position on said glass. A metallic crossbar 21 is secured to the strips 23 and 24 at approximately the longitudinal center of the frame 7, the bent over connecting ends of said crossbar being indicated at 22, Figs. 2 and 3. The crossbar thus serves to materially increase the rigidity of the frame, thereby preventing sagging or other distortion of the sides thereof.

Disposed within the frame are a plurality of heating wires arranged in pairs 17, 17ª, 18, 18ª and 19, 19ª extending longitudinally of the frame, each of said wires being connected at one end thereof to a metallic anchoring strip 20 secured to the opposite end walls of the frame and in electrical contact with one of the terminals of switches 10, 11. The opposite ends of all of the wires are connected to the crossbar 21.

Metallic strip 23 is utilized as a conductor for electrically connecting all of the wires 17, 17ª, 18, 18ª and 19, 19ª with one pole of the storage battery, and for this purpose the strip 23 is electrically connected as indicated at 23ª, Fig. 2, with one of the wires of the cable 14, the other wire of the cable 14 being connected with the switch. The two wires of the double cable 14 are intended to be connected at their free ends 26, 26ª, respectively, to the opposite poles of the battery. Inasmuch as the wires 17ª, 18ª and 19ª are connected with the crossbar 21, which in turn is in electrical connection with one pole of the battery through the medium of strip 23 and one of the wires, for instance wire 26, of cable 14, the cable 15 need be only a single wire cable, said wire being electrically connected at one end to one of the terminals of switch 11 and at its other end to the pole of the battery to which the wire 26ª of cable 14 is connected. By means of these connections it is possible to switch in either the entire system of wires or only those at one side or the other of the central crossbar 21 and the corresponding pilot light 12 or 13.

It is believed that the operation of the device will be clear from the foregoing description taken in connection with the drawing. The device is installed by pressing its suction cups into engagement with the windshield, the vacuum created within the cups being sufficient to sustain the weight of the device. If the usual battery carried by the vehicle is equipped with any of the well known forms of socket connections the ends of the cables 14 and 15 may be fitted with cooperating male members, so that the connection to the battery may be accomplished by merely plugging the male members into the corresponding sockets in the well known manner. With the device thus installed, if the switches 10 and 11 are both turned on, the circuits through all the wires will be closed so that the current will pass through the entire system and thereby heat the glass plate of the windshield over the whole area covered by the heating device, whereby all the occupants of the car will have an unobstructed view of the road ahead. However, when the driver is the only occupant of the car he may, by operating only the switch 10 into "on" position, close the circuits only through the wires 17, 18, 19, thus heating only that portion of the windshield in front of the driver's seat, whereby the consumption of current is considerably decreased as compared with the current necessarily consumed in heating the entire area of the windshield coextensive with the heating device. It will be understood that as long as the switches remain closed the pilot lights 12 and 13 will be illuminated, thus affording a visible indication that the device is in operation.

It will of course be obvious that, instead of connecting both sets of wires 17, 18, 19 and 17ª, 18ª, 19ª to a common connector such as the bar 21, each set of wires may be connected entirely independently of the other set. However, such an arrangement would necessarily multiply the number of cables and thus complicate the mechanism without any appreciable advantageous result.

Having thus described my invention, what I claim is:

1. A device of the character described, comprising a rectangular frame, a glass plate therein, a crossbar connecting the side portions of said frame at approximately the middle of its length, said crossbar being in electrical connection with a source of energy, electrically connected sets of heating elements, each set extending longitudinally from one end of said frame to said crossbar and means for switching in one set of elements independently of said other set.

2. A device of the character described, comprising a rectangular frame, a glass plate therein, a metallic crossbar connecting the side portions of said frame at approximately the center of its length, said crossbar forming a conductor, electrically connected sets of heating wires connected at one end to said crossbar and extending longitudinally from said crossbar toward opposite ends of said frame, and means for selectively closing the circuit through said wires.

3. A windshield heating device, comprising an approximately rectangular frame, a glass plate therein, a crossbar of metal at approximately the middle of the length of the frame and connected to opposite sides thereof, sets of electrically connected heating elements, each set extending in longitudinal direction from one end of the frame to said crossbar, and each of said sets having means of being switched in independently of the other set.

4. A windshield heating device, comprising an elongated frame, a glass plate therein, a metallic crossbar connected to opposite sides of said frame approximately at the middle of the length of the frame where the crossbar forms a conductor, sets of heating wires electrically connected with one another, which at one end are connected with the crossbar and in longitudinal direction extend from the crossbar to the opposite ends of the frame, and means by which one or the other set can be selectively switched in.

5. A windshield heating device, comprising a rectangular frame having elongated side members and end members connecting said side members at their ends and a crossbar connected to the side members approximately at the center of their length thereby to impart rigidity to the frame, a glass plate in said frame, sets of heating wires electrically connected with each other, one set being connected at one end with one of the end members of the frame and the other set with the other end member, and means for selectively switching in either of said sets.

RICHARD NIER.